June 26, 1928.

L. L. CUSTER 1,675,165

AUTOMATIC STARTING AND STOPPING DEVICE FOR MOTOR PROPELLED VEHICLES

Filed Sept. 14, 1925        3 Sheets-Sheet 1

INVENTOR,
L. Luzon Custer,
BY Howard S. Smith,
his ATTORNEY

June 26, 1928.  L. L. CUSTER  1,675,165

AUTOMATIC STARTING AND STOPPING DEVICE FOR MOTOR PROPELLED VEHICLES

Filed Sept. 14, 1925   3 Sheets-Sheet 2

INVENTOR,
L. Luzern Custer,
BY Howard S. Smith,
His ATTORNEY

Patented June 26, 1928.

1,675,165

UNITED STATES PATENT OFFICE.

LEVITT LUZERN CUSTER, OF DAYTON, OHIO.

AUTOMATIC STARTING AND STOPPING DEVICE FOR MOTOR-PROPELLED VEHICLES.

Application filed September 14, 1925. Serial No. 56,222.

This invention relates to new and useful improvements in automatic starting and stopping devices for motor propelled vehicles.

It is one of the principal objects of my invention to provide for amusement parks a ride that comprises a track over which there runs a small automobile, such as a storage battery propelled car, having a segmental circuit closer to co-operate with trip means in the track to automatically, and without jar, start and stop it. It is thus possible, by pushing the car over the trip on the track at the start of the ride, to set in operation the motor mechanism, which may then be controlled at the will of the operator by a switch button until a second trip near the end of the ride is reached, whereupon the car will be automatically stopped. After the second trip is passed, it is beyond the power of the occupant of the car to start it, since it must pass the starting trip, or have its circuit opener "kicked on" from the outside before it can be again started.

However, my invention provides for continuing the operation of the car for any number of laps of the track by the provision of a segmental circuit opener which is so constructed and timed as to be engaged by the starting and stopping trips, or by the stopping trip alone, a desired number of times without opening the motor propulsion circuit.

It is another object of my invention to include the headlight circuit in series with the segmental circuit closer, so that as soon as the latter is automatically actuated by the stopping trip the headlight will go out to indicate to the car starter at the ticket office that the car whose light has been extinguished has completed the trip and is ready to receive other patrons who desire to ride.

My ride equipped with the automatic starting means above described, is admirably adapted for children, since the car may be automatically stopped at the end of the ride with assured safety to the child, and may be stopped and started at will within the limits of its starting and stopping points to afford many thrills and much pleasure to its occupant or occupants.

Figure 1:
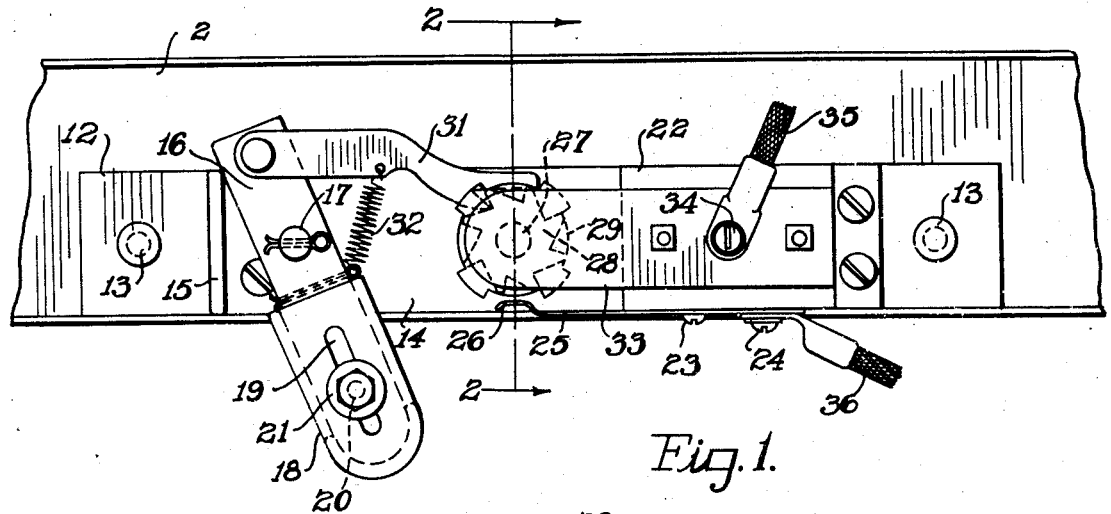
Figure 2:
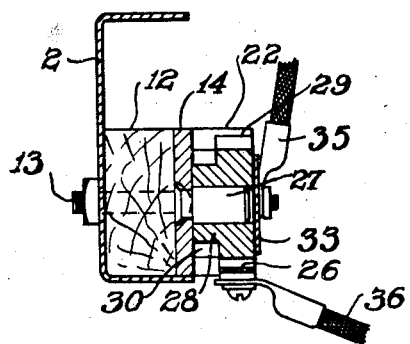
Figures 4, 5:
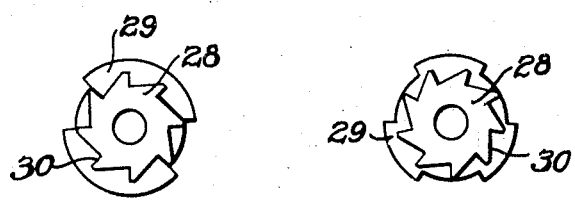
Figure 3:
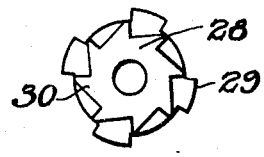
Figure 6:
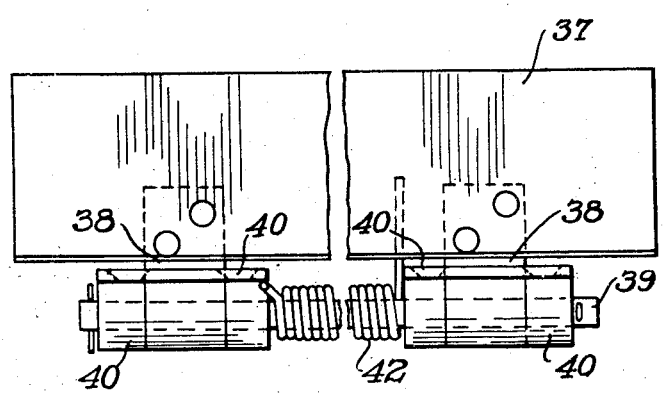
Figure 7:
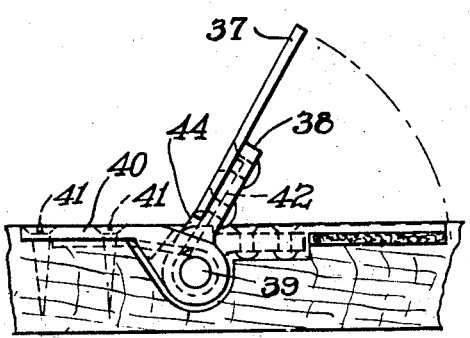
Figure 9:
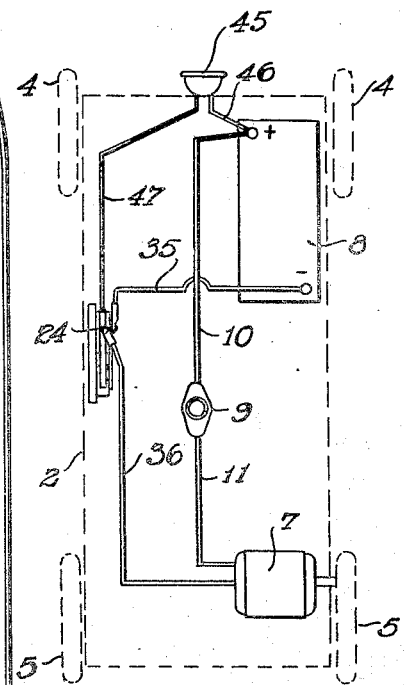
Figure 8:
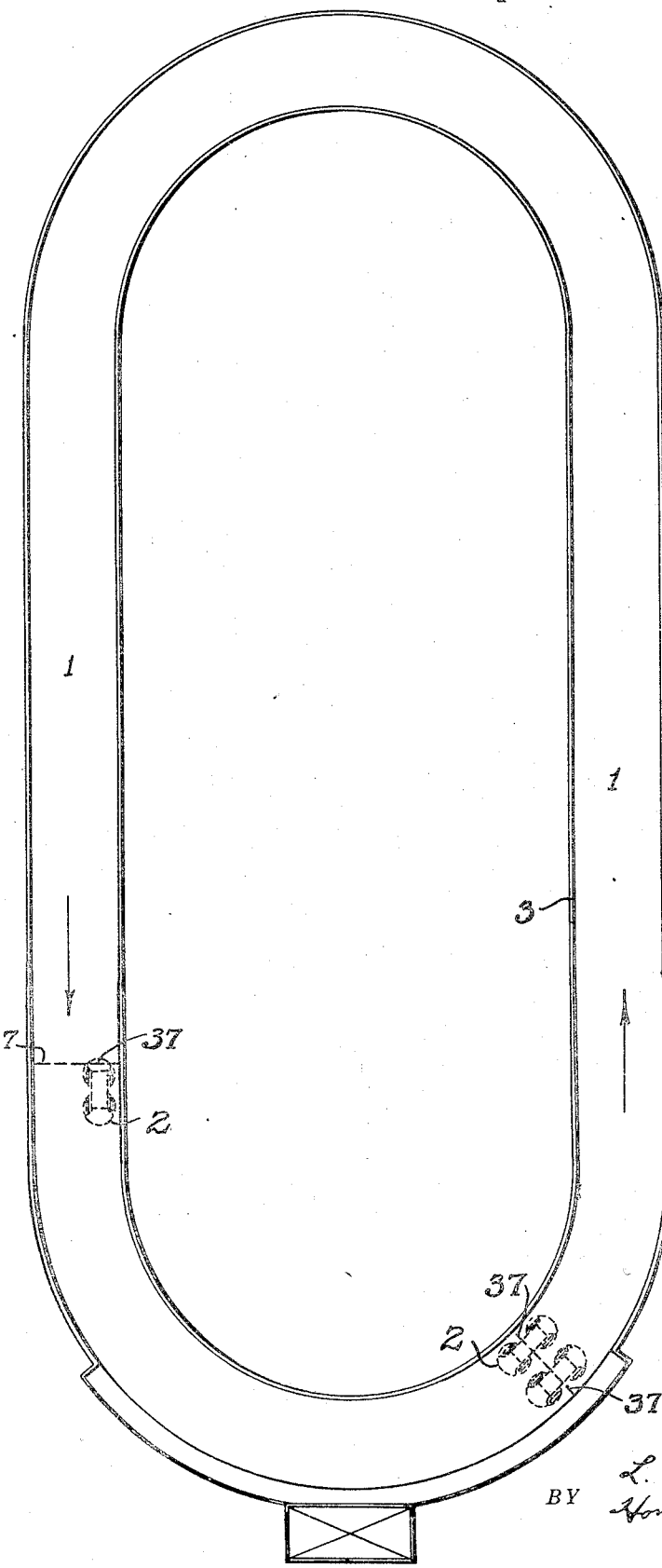
Figure 10:
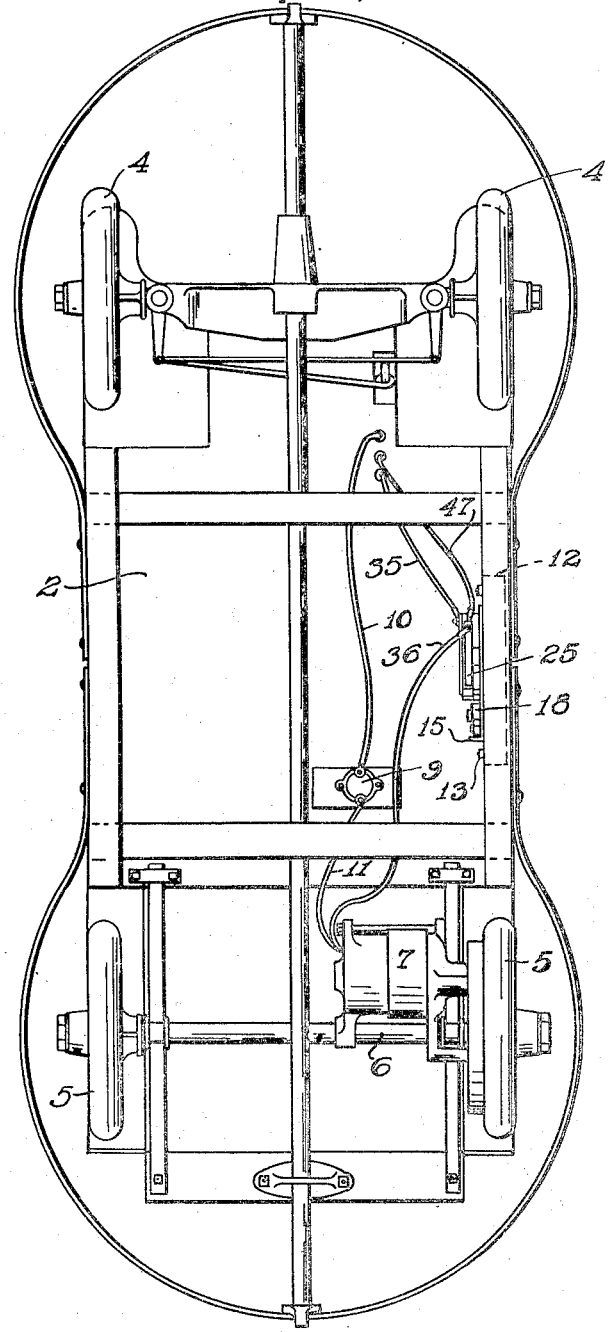

In the accompanying drawings illustrating my invention, Figure 1 is a side view of the motor circuit closing and opening means in my motor propelled vehicle. Figure 2 is a cross sectional view taken on the line 2—2 of Figure 1, showing the ratchet segment contact-engaging disc. Figure 3 is a side view of said disc formed with four segments and eight ratchet teeth. Figure 4 is a side view of one of said discs that has two segments and eight ratchet teeth. Figure 5 is a side view of one of said discs with three segments and nine ratchet teeth. Figure 6 is a front view of one of the trip plates. Figure 7 is a side view of the same secured to the floor of the track. Figure 8 is a diagrammatic view of the track over which my motor propelled car runs, with the starting and stopping trip sections indicated in dotted lines. Figure 9 is a wiring diagram of the motor control and lighting circuits of the car. Figure 10 is a bottom plan view of the car, showing my motor control applied thereto.

Referring to the accompanying drawings for a detailed description of my invention, the numeral 1 designates a track, preferably constructed of wood and in elliptical form, to provide a course for a miniature motor-propelled car 2 that is free to travel around it between side flanges 3, 3. (See Figures 8 and 10.)

The car 2, which is adapted to be driven around the track by children and adults for their amusement, comprises a body of attractive design that is carried by front wheels 4, 4, and rear traction wheels 5, 5 mounted on an axle 6 having a driving connection with an electric motor 7. (See Figures 9 and 10.)

The motor 7 is included in an electric circuit with a storage battery 8. Secured in the floor of the car for easy access, is a push button switch 9 that is connected to the positive terminal of the battery 8 by a wire 10, and to the motor 7 by a wire 11. Through the operation of this push button switch 9 the car may be stopped and started at will while the motor circuit is held closed by automatically controlled segmental contact means now to be described.

Referring to Figures 1, 2 and 10, the numeral 12 designates a longitudinal member, preferably constructed of wood, which is secured to one side of the car 2 by screws 13. Secured to the member 12 is an elongated metal plate 14 having a flanged end 15 which, at the top and bottom, acts as a stop for a pawl actuating lever 16. The latter is pivoted at its upper end to the plate 14 near the flanged end 15 of the latter, by a pin 17.

Secured to the lower end of the lever 16 is an extension 18 formed with a lengthwise slot 19 through which there passes into a tapped hole in the lever a bolt 20 that carries between its head and the lever a washer 21 which is wider than the slot 19. By unloosening the bolt the extension 18 may be longitudinally adjusted along the lever. (See Figure 1.)

Secured to the plate 14 near its front end is a wood block 22 that has secured to its bottom by screws 23 and 24, an elongated spring contact 25 which is curved upwardly at its free end to form a rounded contact portion 26. Immediately above the latter there is rotatably secured by a pin 27 to the plate 14, a segmental ratchet disc 28. Formed on the periphery of the latter adjacent its outer face are a number of segments 29, and on its periphery adjacent its inner face there are formed ratchet teeth 30 which do not extend beyond the bases of its segment portions. (See Figures 1, 2 and 3.)

Adapted to engage the ratchet teeth 30 is a pawl 31 which is pivotally secured at its rear end to the upper end of the lever 16. Connected between the middle portion of the latter and the pawl is a helical spring 32 to normally hold the pawl in engagement with the ratchet teeth and to maintain the lever 16 in the inclined position shown in Figure 1, with its rear end in engagement with the upper portion of the flanged stop 15 on the plate 14. (See Figure 1.)

When the extension 18 on the lever 16 is engaged by the trip means in the track 1, soon to be described, the pawl 31 will engage the ratchet teeth 30 to turn the disc 28. In the present instance there are four segments and eight teeth on the disc, so that when the lever is moved a sufficient distance to bring its extension 18 into engagement with the lower end of the stop 15, the disc will have been moved far enough to bring a segment 29 thereon into, or out of, engagement with the curved end 26 of the spring contact 25. (See Figure 1.)

For the purpose of completing the motor circuit through the disc 28 and the spring contact 25 when a segment 29 on the former is in engagement with the curved end 26 of the latter, there is provided a spring plate 33 which is secured at its rear end to the block 22, with its other end free to engage the face of the disc 28. Secured by a screw 34 to the spring plate 33 is a wire 35 which leads to the negative terminal of the storage battery 8, while a wire 36 secured to the spring contact 25 leads to the motor 7. (See Figures 1 and 3.)

For the purpose of opening and closing the motor circuit through the segmental disc 28 just described, there is provided in the track 1, to trip the lever 16, and through it turn said disc, the following means. Referring to Figures 6 and 7, the numeral 37 designates a trip plate to the rear part of which there are secured two hinge members 38, 38 having enlarged rounded ends formed with axial holes. Passing through these holes in the hinge members 38, 38 is a rod 39 which also projects through holes in the bifurcated portions of two hinge plates 40, 40 to pivotally secure them to the hinge members 38, 38 respectively. Each hinge plate 40 is formed with screw holes to receive screws 41, 41 by which it may be firmly secured to the track 1. (See Figures 6 and 7.)

Coiled around the rod 39 is a heavy wire spring 42, one end of which engages the rear side of the trip plate 37, while its other end is anchored in the track. The floor of the latter is recessed as shown in Figure 7, to receive the rod, spring and hinge members to enable the car wheels to pass over the trip plate without appreciable shock or jar. When a front wheel of the car passes over the trip plate, it will depress it into a recessed portion of the floor against the tension of the spring 42. After the car wheel has passed over the plate, it will be forced upwardly to its normal inclined position by the spring 42 to engage the extension 18 of the lever 16 of the car and force the lower end of said extension against the lower end of the flanged stop 15. This movement of the lever will cause the pawl 31 to turn the disc 28 a sufficient distance to move a segment 29 thereon into, or out of, engagement with the spring contact 25, and thereby to close or open the motor circuit. If the trip plate is placed at the end of a lap on the track, an engagement of the lever 16 with said plate may be made to move a segment 29 out of engagement with the spring contact 25 to automatically open the motor circuit and thereby stop the car. Thus, at the end of a ride, the car may be automatically and safely stopped, while up to the time it is so stopped the occupant may control its movement by the operation of the switch button 9.

If desired, a trip plate 28 may be placed in the track at the start of a ride, so that when a car is pushed over it, the lever 16 will be actuated to move a segment 29 on the disc 28 into engagement with the spring contact 25 to close the motor circuit and thereby start the electric operation of the car. If no trip plate is placed at the starting point on the track, the lever 16 may be kicked by the foot of the starter to accomplish the same result.

For the purpose of stopping the trip plate 37 at its normal inclined position shown in Figure 7 after the spring 42 has forced it violently upwardly, I have formed on each hinge portion 38 a shoulder 44 which engages the inner end of its respective hinge plate 40 to arrest the upward movement of the plate beyond that position. (See Figure 7.)

In order that one car on a wide track may not hold down a long trip plate while the lever 16 of an adjacent car is passing over it, I provide a number of trip plates 37, preferably five in this instance, which are placed in a row at the starting point and at the stopping point on the track, so that one plate is sure to be engaged by the trip lever of every car traveling upon the track. (See Figure 8.)

For the purpose of extinguishing the headlight 45 of the car 2 when the motor 7 is automatically stopped by the trip means previously described, to signal to the starter that the car has completed its run, I have connected said headlight by a wire 46 with the positive terminal of the storage battery 8, and with the contact 25 by a wire 47 which is received by the screw 24. The headlight, thus included in series with the segmental disc 28, will go out when the disc circuit is opened by the trip mechanism previously described. (See Figure 9.)

The segmental disc 28 illustrated in Figures 1 and 3, and before described, provides for the automatic stopping of the car after one lap of the track has been traveled by it. However, if it is desired to stop the car after more than one lap is covered, a disc 28 with a different number of segments 29 may be provided. In Figure 4 I have shown such a disc with two wide segments and eight ratchet teeth for the purpose of stopping the car at the end of the second lap around the track. This disc enables the car to pass a starting trip plate twice and the stopping trip plate once without stopping the car, but when it passes the stopping trip plate a second time, the segment 29 will be moved clear of the spring contact 25 to open the motor circuit and thereby arrest a further movement of the car.

When no starting trip plate is employed and it is desired to stop the car at the end of the second lap, I employ a disc 28 that is formed with three segments and nine ratchet teeth, so that after the lever is "kicked" to move a segment 29 into engagement with the spring contact 25, the segment will still remain in engagement with the contact when the lever is actuated by the stopping trip plate, but will be moved clear of said contact to stop the car when the lever is engaged a second time by the stopping trip plate.

I do not wish to be limited to the details of construction and arrangement herein shown and described, and any changes or modifications may be made therein within the scope of the subjoined claims.

Having described my invention, I claim:

1. In an apparatus of the type described, a track, a vehicle movable over said track, a motor in said vehicle for propelling it, an electric circuit in said vehicle, including the motor, a continuously rotatable segmental disc in said vehicle for closing and opening said motor circuit, separate lever means for rotating said disc, and a trip in said track to engage the lever, and through it to turn the disc a sufficient distance to automatically open the motor circuit to stop the vehicle.

2. In an apparatus of the type described, a track, a vehicle movable over said track, a motor in said vehicle for propelling it, an electric circuit in said vehicle, including the motor, a rotatable ratchet disc formed with segments on its periphery for closing and opening said motor circuit, pawl means for turning the ratchet disc, and a trip in said track for engagement with the pawl means to turn the ratchet disc a sufficient distance to automatically open the motor circuit to stop the vehicle.

3. In an apparatus of the type described, a track, a vehicle movable over said track, a motor in said vehicle for propelling it, an electric circuit in said vehicle, including the motor, a spring contact in said circuit, a rotatable ratchet disc formed with segments on its periphery for periodically engaging said spring contact to close the motor circuit, a pawl for turning said ratchet disc, a lever for actuating said pawl, and a trip in said track for engagement with the lever to turn the ratchet disc to engage a segment with, or to move it away from, the spring contact to automatically close or open said motor circuit.

4. In an apparatus of the type described, a track, a vehicle movable over said track, a motor in said vehicle for propelling it, an electric circuit in said vehicle, including the motor, a segmental ratchet circuit opener in said motor circuit, a pawl for turning said segmental ratchet, trip means in said track for actuating said pawl, and an electric light in series with the circuit opener for the purpose specified.

5. In an apparatus of the type described, a track, a vehicle movable over said track, a motor in said vehicle for propelling it, an electric circuit in said vehicle, including the motor, a circuit opener in said motor circuit, a trip plate hingedly secured transversely of, and to, the track, and a spring for maintaining the trip plate in an inclined position in the path of the circuit opener to engage the same to automatically open the motor circuit to stop the vehicle.

In testimony whereof I have hereunto set my hand this 4 day of September, 1925.

L. LUZERN CUSTER.